3,399,962
METHOD OF PREPARING RHOMBOHEDRAL CRYSTALLINE TUNGSTEN DISULFIDE

Meyer S. Silverman, Norristown, Pa., assignor to Pennsalt Chemicals Corporation, Philadelphia, Pa., a corporation of Pennsylvania
No Drawing. Filed Apr. 21, 1964, Ser. No. 361,597
3 Claims. (Cl. 23—134)

ABSTRACT OF THE DISCLOSURE

A new form of tungsten disulfide having a rhombohedral crystalline structure is provided. A method of preparation of the tungsten disulfide is the simultaneous application of high temperature and high pressure, i.e., about 2000° C. and about 50 kilobars, to an elemental mixture of tungsten and sulfur or to the known hexagonal crystalline form of $WS_2$.

---

This invention relates to a new polymorph of tungsten disulfide, $WS_2$.

The new polymorph has the same chemical composition as tungstenite, the currently-known form of tungsten disulfide but has a distinctly different crystalline structure. The new polymorph also differs markedly from the previously-known $WS_2$ in density, as determined by analysis of X-ray diffraction data and in electrical properties.

Many well-known materials undergo transient polymorphic transformations when subjected to high pressures, with reversion to the original form on reduction of pressure. It is important to note that the polymorph of the present invention has been found to be stable and not to revert to the previously-known $WS_2$ crystalline structure at atmospheric pressure even over time intervals in excess of three months.

The previously-known form of tungsten disulfide has a hexagonal layer-type crystalline structure which is described by A. E. van Arkel, Rec. Trav. Chim. Pays-Bas, vol. 45. 437 (1926) and also by J. Lagrenaudie in J. Phys. Radium, vol. 15, pp. 299–300 (France 1954).

Analysis of the X-ray diffraction pattern of the new polymorph of tungsten disulfide according to methods of "The Interpretation of X-ray Diffraction photographs" by N. F. Henry, H. Lipson and W. A. Wooster, MacMillan & Company, Ltd., St. Martin's St., London (1953), pp. 180–181, strongly indicates a rhombohedral crystalline structure for the compound.

Because of its physical properties as discussed herein, the new polymorph is useful for a variety of applications including incorporation as an element in density measuring instruments, as an electrical circuitry component.

The new polymorph is a conductor of electricity and exhibits a greasy, lubricating external surface. This combination of conductivity and lubricity make the new polymorph well suited to use in electrical contacts involving motion such as motor or generator brushes. Other uses in electrical switching devices and specialized circuitry will be apparent to those skilled in the electrical art.

The new polymorph can be manufactured by reacting elemental tungsten and elemental sulfur in an approximately 1:2.2 atomic ratio at a pressure of approximately 50 kilobars and a temperature of approximately 2,000° C. However, it is to be understood that the new polymorph is an independent invention and is in no way dependent upon the process by which it is formed. (Kilobar as used herein means 14,503.8 pounds per square inch.)

Other methods for forming tungsten disulfide by in situ reaction of compounds containing tungsten with compounds containing sulfur or the conventional form of tungsten disulfide having the hexagonal crystalline structure can be used in place of reaction of the elements tungsten and sulfur.

The new polymorph may also be formed at other combinations of temperature and pressure which are readily ascertainable by subjecting appropriate starting materials to the combination of temperature and pressure in question and analyzing the resulting product by X-ray diffraction.

The time required to produce the new polymorph will generally be from 1 second to about 24 hours and will, in most cases, be from 1 minute to about 1 hour with reaction times of from 2 to about 10 minutes being most preferred.

The apparatus used in the examples which illustrate the practice of the present invention is similar to that developed at the National Bureau of Standards and described in "Compact Multianvil Wedge Type High Pressure Apparatus," E. C. Lloyd, U. O. Hutton and D. P. Johnson in the Journal of Research of the National Bureau of Standards, vol. 63C, No. 1, July-September 1959, pages 59–64. In place of the 9/16" tetrahedral sample holders used in the above reference, 5/8" holders with 1/2" anvil faces were employed in the examples which follow. A polyester film ("Mylar" manufactured by DuPont Company) was used between the anvil assemblies and the polytetra-fluoroethylene sheet ("Teflon," manufactured by Du Pont Company). Additionally, a 0.003" wall boron nitride sleeve was used between the sample and the graphite heaters as electrical insulation. Force was applied to the tetrahedral anvil system by a Watson-Stillman 100-ton hydraulic laboratory press. Pressure calibration was done by measuring the electrical resistance change of bismuth samples. Pressure was measured as a function of ram force and the three discontinuities were considered to occur at 25.4, 27.0 and 88 kilobars. In all of the preparations, a thin sleeve of spectroscopic grade graphite was used as the heating element around the sample, and end plugs of the same material isolated the sample from the platinum or silvered tabs that carried the current from the anvils to the heating sleeve. Temperature calibrations were done by measuring the electrical power input required to obtain temperatures which were indicated by a Chromel-Alumel thermocouple, the tip of which was in good contact with the center of the graphite heating sleeve. The temperatures reported here are thus the highest to which any part of the sample was subjected, and it should be recognized that the ends of the sample in each case were somewhat cooler. Experience in repeated calibrations indicates that the temperature values are uncertain by approximately ±50° C., but the relative differences among the temperature levels of the experiment are believed to be quite reliable.

In each preparation the sample was first compressed in the high pressure apparatus, then heated, and then held at the desired conditions for a measured period of time of one to three minutes as specified in Examples 1 through 7. The power was turned off and the high pressure was maintained until the samples had cooled to nearly ambient temperature. Cooling was very rapid in all cases.

The X-ray diffraction pattern for the new rhombohedral form of $WS_2$ is shown in Table I and the National Bureau of Standards (Circular 539, vol. 8, p. 66 (1958)) pattern for the commonly known hexagonal form of $WS_2$ is shown in Table II. It will be noted that the X-ray diffraction pattern of the new polymorphic form of $WS_2$ is substantially different from that of the hexagonal form. As is well known, X-ray spectographs uniquely characterize crystalline structures and the X-ray diffraction pattern is a definitive description of the new polymorph.

TABLE I.—NEW FORM OF WS$_2$

| $d$ Spacing, $d$ (A): | Relative intensity, I |
|---|---|
| 6.1 | 100 |
| 3.08 | 30 |
| 2.71 | 25 |
| 2.62 | 15 |
| 2.35 | 20 |
| 2.20 | 20 |
| 2.06 | 50 |
| 1.90 | 10 |
| 1.77 | 10 |
| 1.577 | 30 |
| 1.545 | 40 |
| 1.53 | 30 |
| 1.44 | 5 |
| 1.405 | 10 |
| 1.365 | 5 |
| 1.253 | 20 |
| 1.235 | 8 |

TABLE II.—HEXAGONAL WS$_2$

| $d$ Spacing, $d$ (A): | Relative intensity, I |
|---|---|
| 6.18 | 100 |
| 3.089 | 13 |
| 2.731 | 24 |
| 2.667 | 27 |
| 2.498 | 7 |
| 2.277 | 36 |
| 2.061 | 12 |
| 1.834 | 17 |
| 1.5783 | 16 |
| 1.5458 | 8 |
| 1.5288 | 14 |
| 1.4052 | 5 |
| 1.2524 | 7 |

Example 1.—Preparation of the new polymorph

A mixture of 99.5+ percent pure tungsten and 99.999+ percent pure sulfur in a 1:2.2 atomic ratio is inserted into the tetrahedral anvil apparatus. The mixture is first compressed to a pressure of 50 kilobars and the temperature is then raised to 2000° C. After being held at a temperature of 2000° C. for two minutes, the heater power is switched off and after a cooling period of five minutes the pressure is released and the product examined.

The X-ray diffraction pattern of the product indicates the new rhombohedral polymorph of WS$_2$ in yield of better than approximately 90%.

Example 2.—Preparation of the new polymorph of WS$_2$

A mixture of 99.5+ percent pure tungsten and 99.999+ percent sulfur in a 1:2.2 atomic ratio is introduced into the tetrahedral anvil apparatus as in Example 1 and subjected to a pressure of 44 kilobars. The sample temperature is then raised to about 1950° C. while the pressure is maintained. After two minutes at this temperature and pressure, the heater switches are turned off and after a cooling period of about five minutes the pressure is released and the product examined.

The X-ray diffraction pattern of the product indicates the new rhombohedral polymorph of WS$_2$.

Examples 3 through 7.—Chemical analysis of the new polymorph of WS$_2$

Preparation is carried out similarly to the procedures described in Examples 1 and 2 above but under the following reaction conditions gave products which exhibited the characteristic X-ray diffraction pattern of the new polymorph as shown in Table 1. The products obtained from each of the runs is ground, washed in CS$_2$ and filtered to remove any excess sulfur, then rinsed in ethanol and vacuum dried. The chemical analysis by conventional methods of the composite product gives the following results:

W:72.2 (calculated for WS$_2$—W:74.2)
S:25.6 (calculated for WS$_2$—S:25.8)

Reaction conditions are as follows:

| Example | Temperature, approx. (° C.) | Pressure (kilobars) | Reaction time after reaching temp. (minutes) |
|---|---|---|---|
| 3 | 1,975 | 45 | 2 |
| 4 | 1,950 | 44 | 2 |
| 5 | 2,000 | 45 | 3 |
| 6 | 1,950 | 45 | 2 |
| 7 | 1,990 | 45 | 1 |

Example 8.—Stability of a new WS$_2$ polymorph

Two separate samples of the new polymorph produced as described in Examples 1 and 2 are analyzed by X-ray diffraction pattern after standing at ambient temperature and pressure for three months. The characteristic pattern of the new polymorph (shown in Table I) and the external appearance of the polymorph remained unchanged.

Many different embodiments of this invention may be made without departing from the spirit and scope thereof, and it is to be understood that the invention includes all such embodiments and is not limited by the above description or examples.

What is claimed is:

1. A process for preparing a polymorph of WS$_2$ having a rhombohedral crystalline structure which comprises compressing a finely-divided material selected from the group consisting of hexagonal crystalline WS$_2$ and a mixture of tungsten and sulfur wherein the atomic ratio of tungsten to sulfur is approximately 1 to 2.2, to a pressure of about 50 kilobars, heating said compressed material to a temperature of about 2000° C., cooling the material to ambient temperature while maintaining compression, and releasing said pressure to recover the rhombohedral WS$_2$.

2. A process according to claim 1 wherein the pressure is in the range of about 44 to about 50 kilobars.

3. The process of claim 1 wherein the starting material consists essentially of hexagonal crystalline WS$_2$.

References Cited

UNITED STATES PATENTS 2,770,527  11/1956  Alderson et al. _____ 23—134
3,253,886  5/1966  Lamprey et al. _____ 23—134

FOREIGN PATENTS 1,155,103  10/1963  Germany.

OTHER REFERENCES

Article by Bell et al., "Preparation and Characterization of a New Crystalline Form of Molybdenum Disulfide," Jour. of the American Chemical Society, volume 79, No. 13, July 5, 1957, pp. 3351–3358.

Article by Wildervanck et al., "Preparation and Crystallinity of Molybdenum and Tungsten Sulfides," Zeit. fur anorganische and allgemeine Chemie, Band 328, Heft 5–6, April 1964, pp. 309–318.

Cotton et al.: "Advanced Inorganic Chemistry," 1962, p. 776 and p. 782.

Mellor: "Comprehensive Treatise on Inorganic & Theoretical Chemistry," volume 11, 1931, pp. 856 and 857.

Gmelin: "Handbuch Der Anorganischen Chemie," 8 Auf., System Number 54, 1933, pp. 184 and 185.

OSCAR R. VERTIZ, *Primary Examiner.*

B. H. LEVENSON, *Assistant Examiner.*